(12) United States Patent
Hwang

(10) Patent No.: US 6,603,604 B2
(45) Date of Patent: Aug. 5, 2003

(54) SCREEN FOR PROJECTION TELEVISION

(75) Inventor: Gyu-hwan Hwang, Suwon-si (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 10/237,185

(22) Filed: Sep. 9, 2002

(65) Prior Publication Data
US 2003/0067682 A1 Apr. 10, 2003

(30) Foreign Application Priority Data
Oct. 9, 2001 (KR) ........................... 2001-62076

(51) Int. Cl.[7] ............................ G03B 21/60; G02B 3/08
(52) U.S. Cl. ........................ 359/457; 359/742
(58) Field of Search .................. 359/457, 742

(56) References Cited
U.S. PATENT DOCUMENTS
6,292,295 B1 * 9/2001 Yamashita et al. .......... 359/742
6,407,860 B1 * 6/2002 Funazaki et al. ............ 359/457

* cited by examiner

Primary Examiner—Christopher Mahoney
(74) Attorney, Agent, or Firm—Sughrue Mion, PLLC

(57) ABSTRACT

A screen of a projection television may include a Fresnel lens for converting an incident light beam emitted from an image source into a parallel beam, a lenticular lens formed by sequentially arranging multiple lens elements having a column shape parallel to one another for forming an image from the parallel beam output from the Fresnel lens and spreading the formed image, and a protective panel installed on the front surface of the lenticular lens for protecting the lenticular lens. The Fresnel lens may include a base substrate and a lens unit contacting one side of the base substrate, patterns having a saw-toothed shape formed on a surface of the lens unit facing a lenticular lens, and portions of each pattern corresponding to a sharp portion of a sawtooth may be a processed curved surface having a predetermined curvature.

10 Claims, 4 Drawing Sheets

SCREEN FOR PROJECTION TELEVISION

BACKGROUND OF THE INVENTION

1. Field of the Invention

The present invention relates to a projection television and, more particularly, to a screen of a projection television having a high brightness.

2. Description of the Related Art

With the development of the information industry, there has been a need for an image display medium having a large screen. However, there is a technical limit in making a rectangular CRT of a television which has been a main conventional display device medium. Accordingly, to provide an image on a large screen, an image projection system in which a small CRT or LCD generates an image which is magnified by an optical lens to be projected on a large screen has been developed and widely used. The image projection system is known as a projection television or a video projector.

The image projection system can be divided into two types according to an image projecting method. One is a front projection system in which an image is directly projected on the front surface of a screen, and the other is a rear projection system in which an image is projected on the rear surface of a screen. The brightness of a display image of the rear projection system is much higher than that of the front projection system.

Referring to FIG. 1, a conventional projection television screen includes a Fresnel lens 11 for converting a divergent light beam from a projection lens (not shown) provided at a projection apparatus (not shown) into a parallel beam by receiving a light beam emitted from an image source (not shown) and deflecting the light beam so that an image is displayed at substantially uniform brightness throughout a wide viewing angle. A lenticular lens 12 is arranged close to the Fresnel lens 11 as a light spreading means for forming an image by spreading the parallel beam output from the Fresnel lens 11. The lenticular lens 12 is formed of a plurality of lens elements 13 having a column shape and arranged consecutively. A screen protective panel (not shown), which is formed of an acryl material, is provided on the front surface of the lenticular lens 12, that is, at the position facing a viewer. A protrusion 14 having a predetermined height is formed at a connection portion of each lens element at the front surface of the lenticular lens 12 contacting the rear surface of the screen protective panel, to absorb part of light divergently coming out of a bulged portion 13a of the lens element 13. A black strip 14a is coated in black ink at the end portion of the protrusion 14. Thus, the contrast of an image formed on the front surface of the lenticular lens 12 can be improved.

FIG. 2 is a cross sectional view of the Fresnel lens 11 shown in FIG. 1, vertically crossing the center of the Fresnel lens 11. Referring to FIG. 2, the shape of a surface facing the lenticular lens 12 has a saw-toothed shape. FIG. 3 shows a magnified portion of a circled portion A in FIG. 2. Referring to FIG. 3, part of incident light, in particular a light beam 22 input at an angle greater than the critical angle of the total internal reflection of a sharp portion 20 of a sawtooth, cannot pass through the Fresnel lens 11 due to the total internal reflection. If the light cannot pass through the Fresnel lens 11, and proceeds in a direction totally different from the originally set direction after the total internal reflection, it cannot be used in image projection.

In the above conventional screen, the efficiency of light passing is lowered due to loss of light at the Fresnel lens so that the entire brightness of the screen is lowered.

SUMMARY OF THE INVENTION

To solve the above-described problems, it is an aspect of the present invention to provide a projection television screen having a high brightness by minimizing loss of light due to the shape of the surface of the Fresnel lens.

To achieve the above aspect, there may be provided a screen of a projection television comprising a Fresnel lens for converting an incident light beam emitted from an image source into a parallel beam, a lenticular lens formed by sequentially arranging a plurality of lens elements having a column shape parallel to one another for forming an image from the parallel beam output from the Fresnel lens and spreading the formed image, and a protective panel installed on the front surface of the lenticular lens for protecting the lenticular lens. The Fresnel lens may comprise a base substrate and a lens unit contacting one side of the base substrate, patterns having a saw-toothed shape formed on a surface of the lens unit facing a lenticular lens, and a portion of each pattern corresponding to a sharp portion of a sawtooth may have a processed curved surface having a predetermined curvature.

In the present invention, the refractive indexes of the base substrate and the lens unit may be different from each other.

In the present invention, the curved surface may be a spherical surface or an aspherical surface.

Thus, by using the screen of the projection television according to the present invention, the brightness of the projection television can be improved and the brightness can be uniformly distributed throughout the entire screen.

BRIEF DESCRIPTION OF THE DRAWINGS

The above aspects and advantages of the present invention will become more apparent by describing in detail exemplary embodiments thereof with reference to the attached drawings, in which.

DETAILED DESCRIPTION OF THE INVENTION

Figure 1:
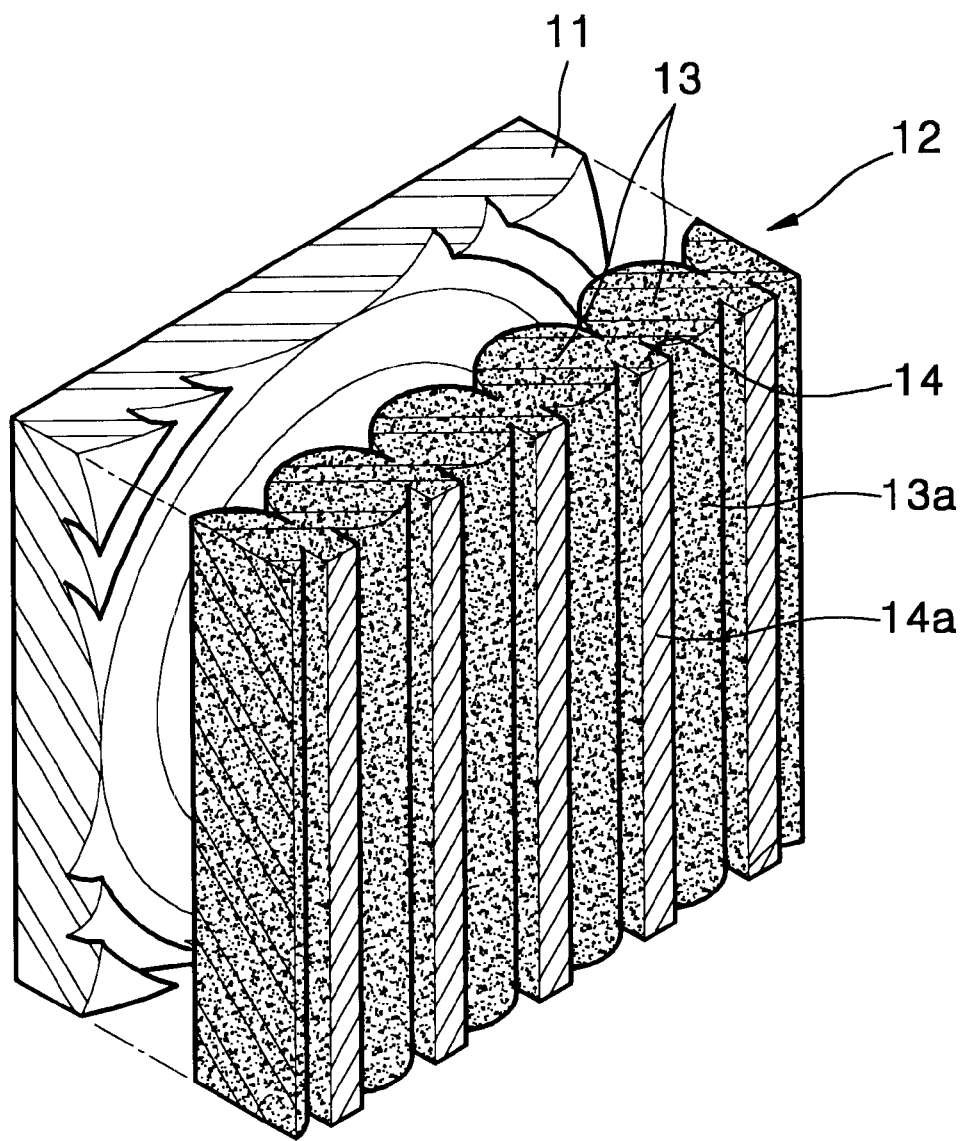
FIG. 1 is a perspective view showing the structure of a conventional projection television screen.
Figure 2:
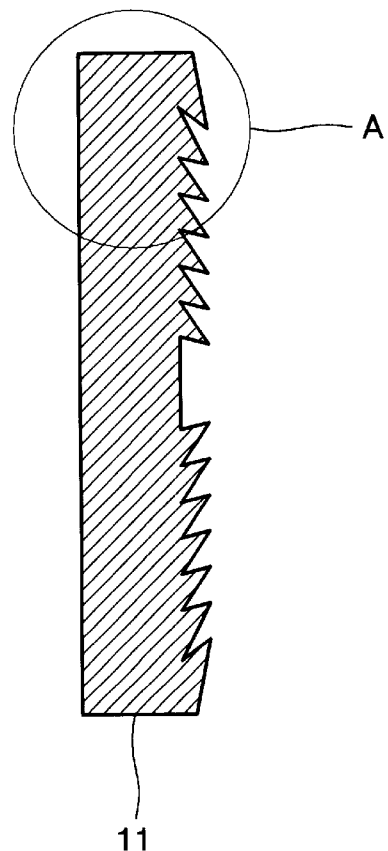
FIG. 2 is a cross sectional view of the Fresnel lens of FIG. 1 vertically crossing the center of the Fresnel lens 11.

A projection television screen according to an exemplary embodiment of the present invention will now be described in detail with reference to the accompanying drawings. In the drawings, the thickness of a layer or area is shown to be greater than the actual thickness for the convenience of explanation.

Figure 4:
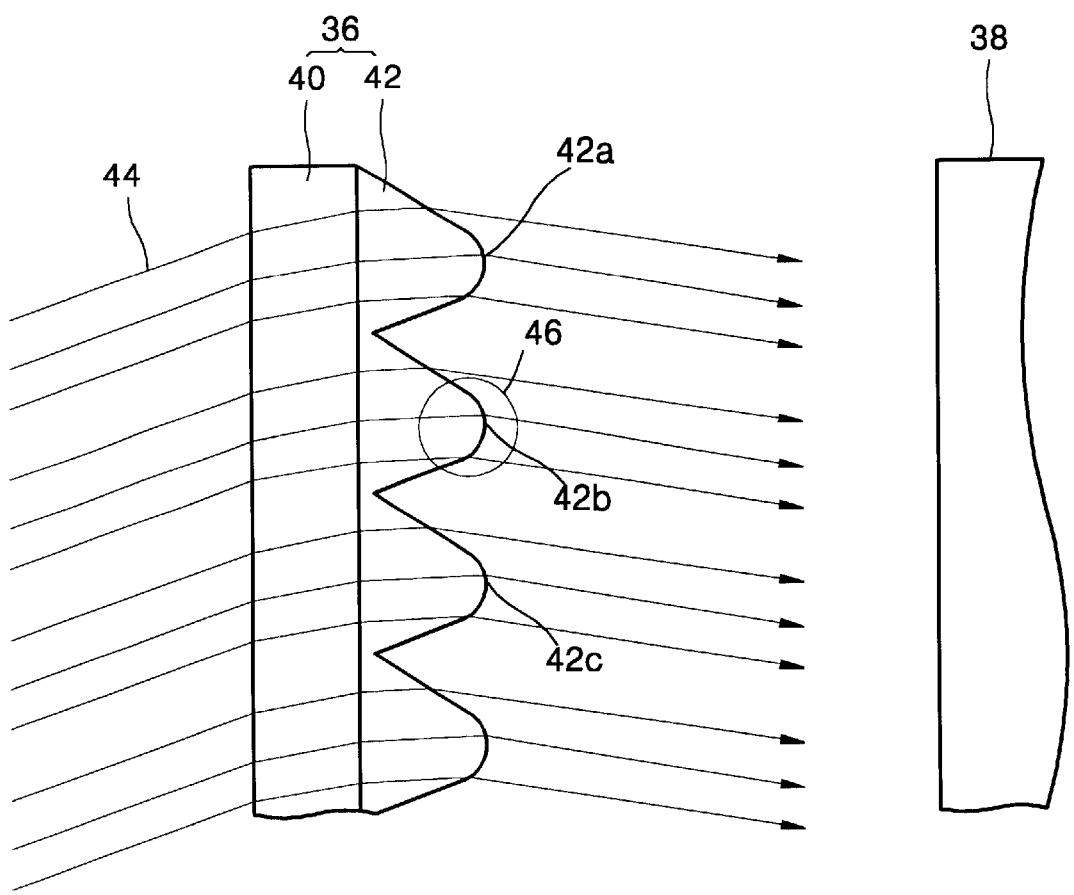
FIG. 4 is a sectional view of the Fresnel lens of the projection television screen according to an exemplary embodiment of the present invention.

Referring to FIG. 4, a screen of a projection television according to an exemplary embodiment of the present invention may include a Fresnel lens 36 for converting an incident light beam from an image source (not shown) of a projection apparatus (not shown) into a parallel beam, a lenticular lens 38 formed of a plurality of lens elements having a column shape which are arranged consecutively, for forming an image from the parallel beam input from the Fresnel lens 36 and spreading the image, and a protective panel (not shown) installed at the front surface of the lenticular lens 38 for protecting the lenticular lens 38. The Fresnel lens 36 may include a base substrate 40 and a lens unit 42 contacting one side of the base substrate 40. The base substrate 40 and the lens unit 42 may be formed of different materials to increase a change of an optical path passing through the base substrate 40 and the lens unit 42. That is, the refractive index of the base substrate 40 may be different from that of the lens unit 42. By doing so, a light beam 44 emitted from the image source such as a Cathode Ray Tube (CRT), Liquid Crystal Display (LCD) or other image display device is incident on the base substrate 40 and then primarily refracted in a predetermined direction according to Snell's rule. The primarily refracted light beam is incident on the lens unit 42 and then refracted secondarily in a predetermined direction according to Snell's rule.

Thus, as the light beam 44 emitted from the image source is sequentially refracted by the base substrate 40 and the lens unit 42 to greatly change the optical path of the light beam 44, an incident angle of the light beam incident on the exit surface of the lens unit 42 is reduced compared to the conventional technology. That is, the incident angle of the light beam incident on the exit surface is smaller than the critical angle at which total internal reflection occurs so that most of the light incident on the lens unit 42 passes through the lens unit 42 in a predetermined direction. Accordingly, loss of light due to the total internal reflection when the light beam passes through the lens unit 42 is minimized. To obtain such a result, the refractive index of the lens unit 42 may be greater than that of the base substrate 40.

Meanwhile, patterns 42a, 42b, and 42c having a sawtooth shape may be formed on the surface of the lens unit 42 facing the lenticular lens 38. Considering that the profile of the Fresnel lens 36 shown in FIG. 4 is obtained by cutting along the center of the Fresnel lens 36, it can be seen that the patterns 42a, 42b, and 42c having a sawtooth shape are formed coaxially. Since each of the patterns 42a, 42b, and 42c may have the same shape, a description about one of the patterns 42a, 42b, and 42c (hereinafter, called "representative pattern") will, for exemplary purposes only, replace descriptions of all patterns.

Figure 3:
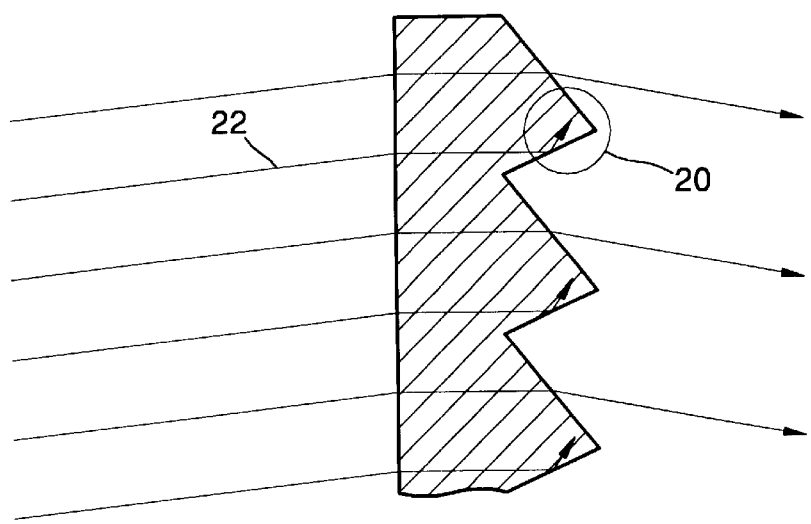
FIG. 3 is a section view showing a magnified portion of FIG. 2.

The pattern 42b is described as a representative pattern. The shape of the representative pattern 42b substantially looks like a sawtooth. When compared with the conventional Fresnel lens 11 shown in FIG. 3, it can be seen that a portion 46 of the representative pattern 42b corresponding to the sharp portion of a sawtooth (please refer to reference numeral 20 of FIG. 3) may be a curved surface processed to have a predetermined curvature. Here, the portion 46 (hereinafter, called "curved portion") corresponding to the sharp portion of a sawtooth of the representative pattern 42b may be an aspherical surface such as an oval surface or parabolic surface considering aberration of a light beam passing through the curved portion 46.

Since the Fresnel lens 36 according to the present invention may include the base substrate 40 and the lens unit 42 having different refractive indexes, and predetermined patterns having the curved portion 46 provided coaxially at the surface of the lens unit 42 facing the lenticular lens 38, the light beam 44 emitted from the image source and incident on the base substrate 40 may be refracted such that total internal reflection can be minimized when it is refracted toward the lens unit 42. Even when the light beam 44 is refracted toward the portion corresponding to the sharp portion of a sawtooth (20 of FIG. 3) of the conventional lens unit 42, since the corresponding portion is the curved portion 46 which is processed to prevent the generation of total internal reflection, the light beam 44 passes through the lens unit 42 without loss of light due to the total internal reflection. Consequently, the brightness at each portion of the projection television screen is remarkably improved.

Figure 5:
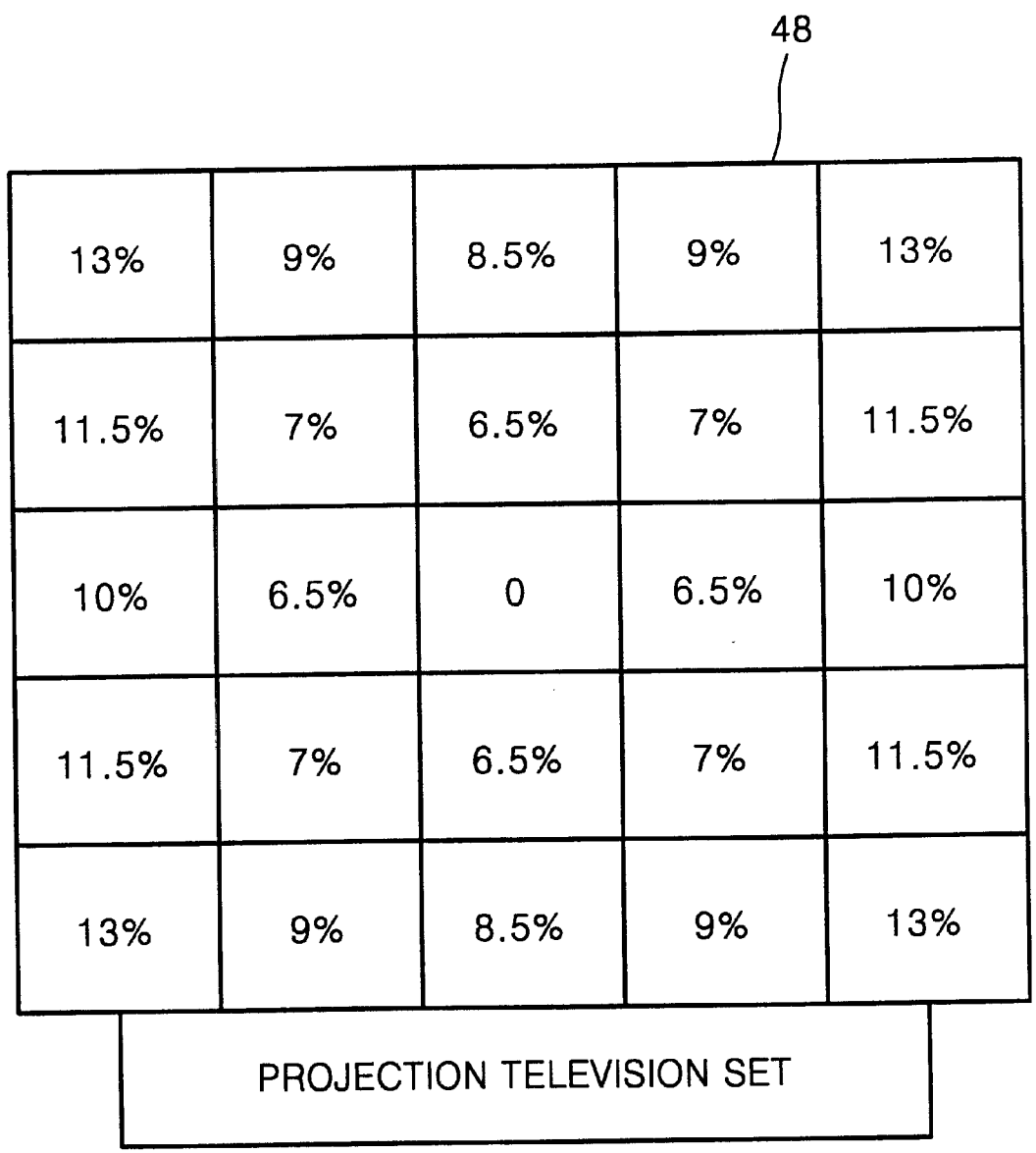
FIG. 5 is a table of brightness improvement distribution showing a degree of improvement of brightness at each area of a projection television having a screen to which the Fresnel lens of FIG. 4 is adopted.

FIG. 5 is a brightness improvement distribution table showing a degree of improvement of brightness at each area of the screen 48 when the screen according to the exemplary embodiment of the present invention is adopted in a projection television. It can be seen from the drawing that a degree of improvement of brightness increases from the center of the screen 48 to the outside. In particular, the brightness at the four corners of the screen 48 is improved by 13% compared to the conventional projection television screen.

While this invention has been particularly shown and described with reference to preferred embodiments thereof, it will be understood by those skilled in the art that various changes in form and details may be made therein without departing from the spirit and scope of the invention as defined by the appended claims. For example, a skilled person in the art can configure the base substrate 40 of the screen to be multiple layers having sequentially increasing refractive indexes. Also, to improve brightness of a particular area of the screen, the patterns formed on the surface of the lens unit 42 facing the lenticular lens 38 can be formed not to be coaxial or to have a different interval between the coaxial patterns.

As described above, to minimize the total internal reflection, the projection television screen according to the present invention may include the base substrate and the lens unit having different refractive indexes. Also, patterns having a saw-toothed shape and processed such that a portion corresponding to the sharp portion of a sawtooth having a predetermined curvature may be formed on the surface of the lens portion facing the lenticular lens. Thus, by using the screen of the projection television according to the present invention, the brightness of the projection television can be improved and the brightness can be uniformly distributed throughout the entire screen.

While the principles of the invention have now been made clear in the exemplary embodiments, it will be readily apparent to one skilled in the art that there are many modifications of structure, arrangements, proportions, the elements, materials, and components used in the practice of this invention and otherwise, which are particularly adapted for specific environments and operation requirements without departing from these principles. The appended claims are therefore intended to cover and embrace any such modifications within the limits only of the true spirit and scope of the invention.

What is claimed is:

1. A screen of a projection television comprising:
   a Fresnel lens for converting an incident light beam emitted from an image source into a parallel beam;
   a lenticular lens including a plurality of sequentially arranged lens elements having a column shape parallel to one another for forming an image from the parallel beam output from the Fresnel lens and spreading the formed image; and
   a protective panel installed on the front surface of the lenticular lens for protecting the lenticular lens,
   wherein the Fresnel lens comprises a base substrate and a lens unit contacting one side of the base substrate, patterns having a saw-toothed shape are formed on a surface of the lens unit facing a lenticular lens, and a portion of each pattern corresponding to a sharp portion of a sawtooth is a processed curved surface having a predetermined curvature.

2. The screen as claimed in claim 1, wherein the refractive indexes of the base substrate and the lens unit are different from each other.

3. The screen as claimed in claim 1, wherein the curved surface is one of a spherical surface and an aspherical surface.

4. The screen as claimed in claim 3, wherein the aspherical surface is one of an oval surface and a parabolic surface.

5. A screen of a projection television comprising a Fresnel lens for converting an incident light beam emitted from an image source into a parallel beam, wherein the Fresnel lens comprises a base substrate and a lens unit contacting one side of the base substrate;

patterns having a saw-toothed shape formed on a surface of the lens unit facing a lenticular lens; and a portion of each pattern at a distal end of a sawtooth is a processed curved surface having a predetermined curvature.

6. The screen as claimed in claim 5, wherein the refractive indexes of the base substrate and the lens unit are different from each other.

7. The screen as claimed in claim 5, wherein the curved surface is one of a spherical surface and an aspherical surface.

8. The screen as claimed in claim 7, wherein the aspherical surface is one of an oval surface and a parabolic surface.

9. The screen as claimed in claim 5, further comprising a lenticular lens including a plurality of sequentially arranged lens elements having a column shape parallel to one another for forming an image from the parallel beam output from the Fresnel lens and spreading the formed image.

10. The screen as claimed in claim 5, further comprising a protective panel installed on the front surface of the lenticular lens for protecting the lenticular lens.

* * * * *